United States Patent [19]

Saito et al.

[11] Patent Number: 5,761,728
[45] Date of Patent: Jun. 2, 1998

[54] ASYNCHRONOUS ACCESS SYSTEM CONTROLLING PROCESSING MODULES MAKING REQUESTS TO A SHARED SYSTEM MEMORY

[75] Inventors: Hiroshi Saito; Takatsugu Sasaki; Hirohide Sugahara; Akira Kabemoto; Hajime Takahashi; Jun Funaki, all of Kawasaki, Japan

[73] Assignee: Fujitsu Limited, Kawasaki, Japan

[21] Appl. No.: 777,184

[22] Filed: Dec. 27, 1996

Related U.S. Application Data

[63] Continuation of Ser. No. 138,218, Oct. 20, 1993, abandoned.

[30] Foreign Application Priority Data

Oct. 20, 1992 [JP] Japan ............................. 4-282022

[51] Int. Cl.⁶ ........................... G06F 13/16; G06F 9/38
[52] U.S. Cl. ................. 711/147; 711/168; 711/169; 711/150; 711/127; 395/873; 395/878; 395/872
[58] Field of Search .................... 395/425, 496, 395/873, 474, 878, 872, 287; 345/25; 364/DIG. 1; 711/147, 168, 150, 169, 127, 128

[56] References Cited

U.S. PATENT DOCUMENTS

| | | | |
|---|---|---|---|
| 4,381,541 | 4/1983 | Baymann, Jr. et al. | 711/128 |
| 4,399,435 | 8/1983 | Urabe | 345/25 |
| 4,724,518 | 2/1988 | Steps | 711/127 |
| 4,736,293 | 4/1988 | Patrick | 711/128 |
| 4,755,933 | 7/1988 | Teshima et al. | 711/157 |
| 5,337,414 | 8/1994 | Hashemi et al. | 395/872 |
| 5,388,208 | 2/1995 | Weingartner et al. | 345/185 |
| 5,615,355 | 3/1997 | Wagner | 711/167 |

FOREIGN PATENT DOCUMENTS 58-166585  10/1983  Japan .

*Primary Examiner*—Tod R. Swann
*Assistant Examiner*—J. Peikari
*Attorney, Agent, or Firm*—Staas & Halsey

[57] ABSTRACT

An asynchronous access system for a computer system includes processing modules performing processes, at least one shared system memory module, and a system bus connecting the processing modules and the shared system memory module. Each of the processing modules includes a processor, a plurality of buffers coupled to the processor and to the system bus, and a controlling unit for writing data from the plurality of processors into the shared system memory module. Data is written into the shared system memory module by a processor generating write instructions to write data via the plurality of buffers and the system bus. The controlling unit controls the writing such that one writing instruction writes data into a plurality of buffers, then transfers the data to the shared system memory module via the system bus, with another writing instruction writing additional data into another plurality of buffers and transferring the additional data to the shared system memory module.

8 Claims, 13 Drawing Sheets

SC

EC

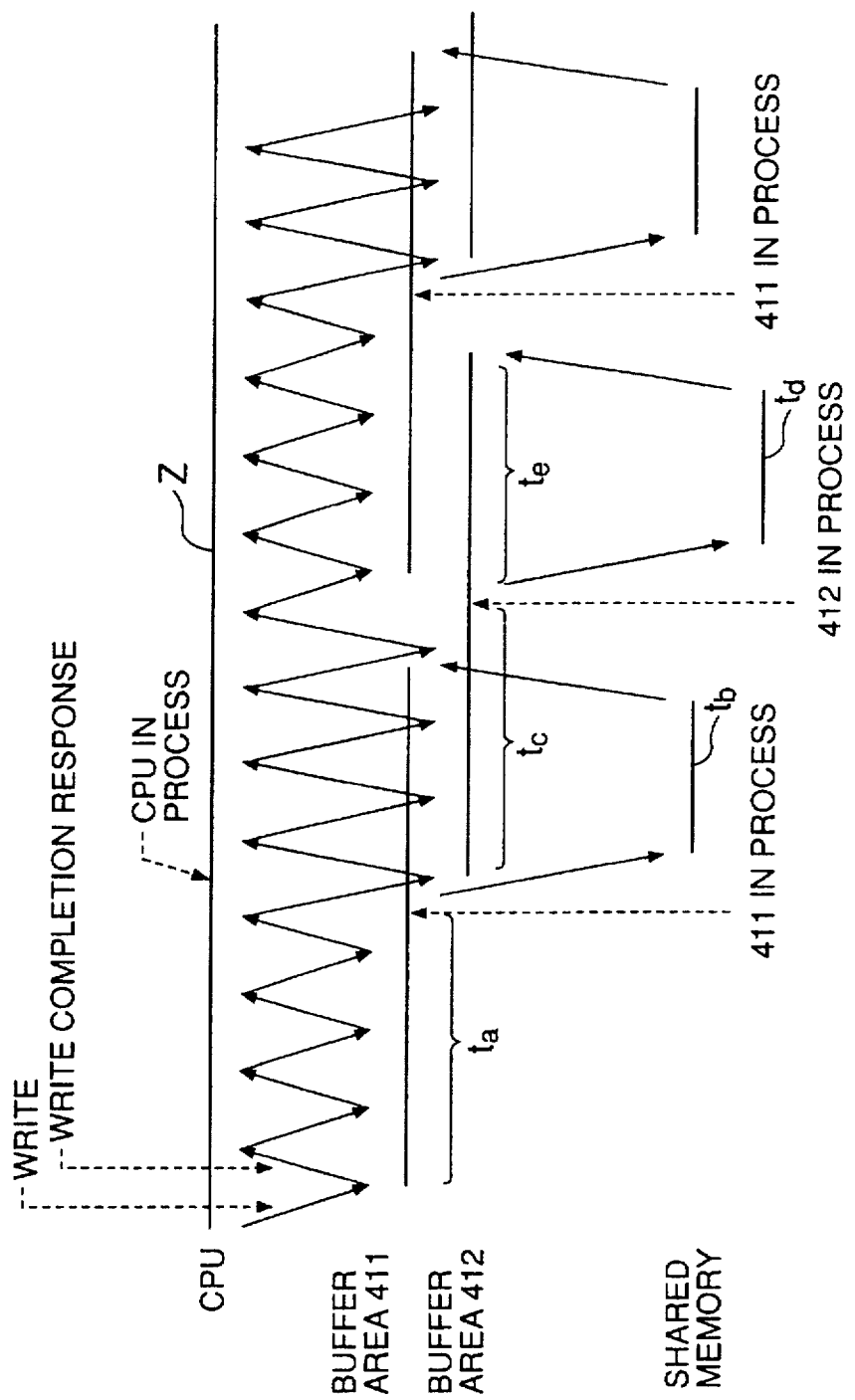

ASYNCHRONOUS ACCESS SYSTEM CONTROLLING PROCESSING MODULES MAKING REQUESTS TO A SHARED SYSTEM MEMORY

This application is a continuation of application No. 08/138,218, filed Oct. 20, 1993, now abandoned.

BACKGROUND OF THE INVENTION

1. Field of the Invention

The present invention generally relates to an asynchronous access system for a shared system memory, and a particularly to an asynchronous access system applied to a computer system having processing modules and shared system memory modules connected together via a system bus, in which the processing modules make requests to the shared system memory modules for accessing based on write instructions.

2. Description of the Related Art

A computer system is known which includes one or a plurality of processing modules and one or a plurality of shared system memory modules connected to the processing modules via a system bus. Each of the processing modules has a main memory, a central processing unit (processor) and a connection unit for connection to the system bus. Each of the shared system memory modules has a shared system memory unit and a connection unit for connection to the system bus. The processing modules directly access the shared system memory modules. Hence, data transfer is carried out for each word via the system bus in synchronism with an access instruction.

Hence, in a case where a large number of processing modules are connected to the system bus in the above synchronous access system, the frequency of accessing the system bus is high. Hence, speeding up accessing the shared system memory modules to improve the system performance is necessary. In this regard, an asynchronous access system is required in which the processing modules asynchronously access the shared system memory modules with improved efficiency in execution of instructions.

When a processing module attempts to write arbitrary data into a shared system memory module in a conventional asynchronous access system for the above-described computer system, the connection unit in the above processing module recognizes a write instruction to the shared system memory module generated by the CPU provided therein, and writes the write instruction into a built-in write buffer. Then, the connection unit returns a write completion response to the CPU.

More particularly, referring to FIG. 1, data from the CPU is written into the built-in write buffer of the connection unit, as indicated by $a_1$. When the data is completely written into the buffer, the write completion response is returned to the CPU, as indicated by $b_1$. In the same manner, data is written into the buffer and the write completion response is returned to the CPU in the alternating sequence of $a_2$, $b_2$, $a_3$, $b_3$, $a_4$ and $b_4$.

When the write buffer built into the connection unit becomes full of data, the connection unit reads data equal to one block from the built-in buffer, and transfers the read one-block data to the requested shared system memory module $c_1$ via the system bus. Thereby, the transferred one-block data is written into the shared system memory unit of the shared system memory module during a period $t_1$. Then, as indicated by $d_1$, the shared system memory module returns a block data write completion response to the processing module via the system bus. In the above manner, data is repeatedly transferred for each block.

The write completion responses $b_1$ through $b_4$ to the CPU are made before data is completely transferred and written into the shared system memory module. As a result, the operation speed of the CPU can be improved. The completion of writing data into the shared system memory module is totally asynchronous to the completion of an instruction of the CPU. With the above in mind, a serializing instruction is provided to ensure writing of data into the shared system memory module. Upon receipt of the serializing instruction, block writing is carried out.

However, the above-mentioned conventional asynchronous access system has the following disadvantage. When writing of one-block data into the shared system memory module is started as indicated by $c_1$ shown in FIG. 1, the CPU of the processing module is inhibited from operating until the block data write completion response is returned from the shared system memory module, as indicated by a broken line $t_2$. During the above period, the CPU cannot make a request to the shared system memory module to write data therein.

SUMMARY OF THE INVENTION

It is a general object of the present invention to provide an asynchronous access system in which the above disadvantages are eliminated.

A more specific object of the present invention is to provide an asynchronous access system in which a CPU of a processing module can accept a write request for a shared system memory module while an access to the shared system memory module is being processed.

The above objects of the present invention are achieved by an asynchronous access system for a computer system. The asynchronous access system of the present invention comprises: processing modules performing processes, at least one shared system memory modules, and a system bus connecting the processing modules and the above at least one shared system memory module.

Each of the above processing modules comprises: a processor, a plurality of buffers coupled to the processor and the system bus, the processor generating write instructions to write data into the above at least one shared system memory module via the plurality of buffers and the system bus, and a controller for writing, when first data from the processor written into a first one of the plurality of buffers in response to a first write instruction is being transferred to the above at least one shared system memory module via the system bus, second data from the processor into a second one of the plurality of buffers in response to a second write instruction generated by the processor after the first write instruction.

BRIEF DESCRIPTION OF THE DRAWINGS

Other objects, features and advantages of the present invention will become more apparent from the following detailed description when read in conjunction with the accompanying drawings, in which:

FIG. 14 is a sequence chart of the operation of the embodiment of the present invention.

DESCRIPTION OF THE PREFERRED EMBODIMENT

Figure 1:
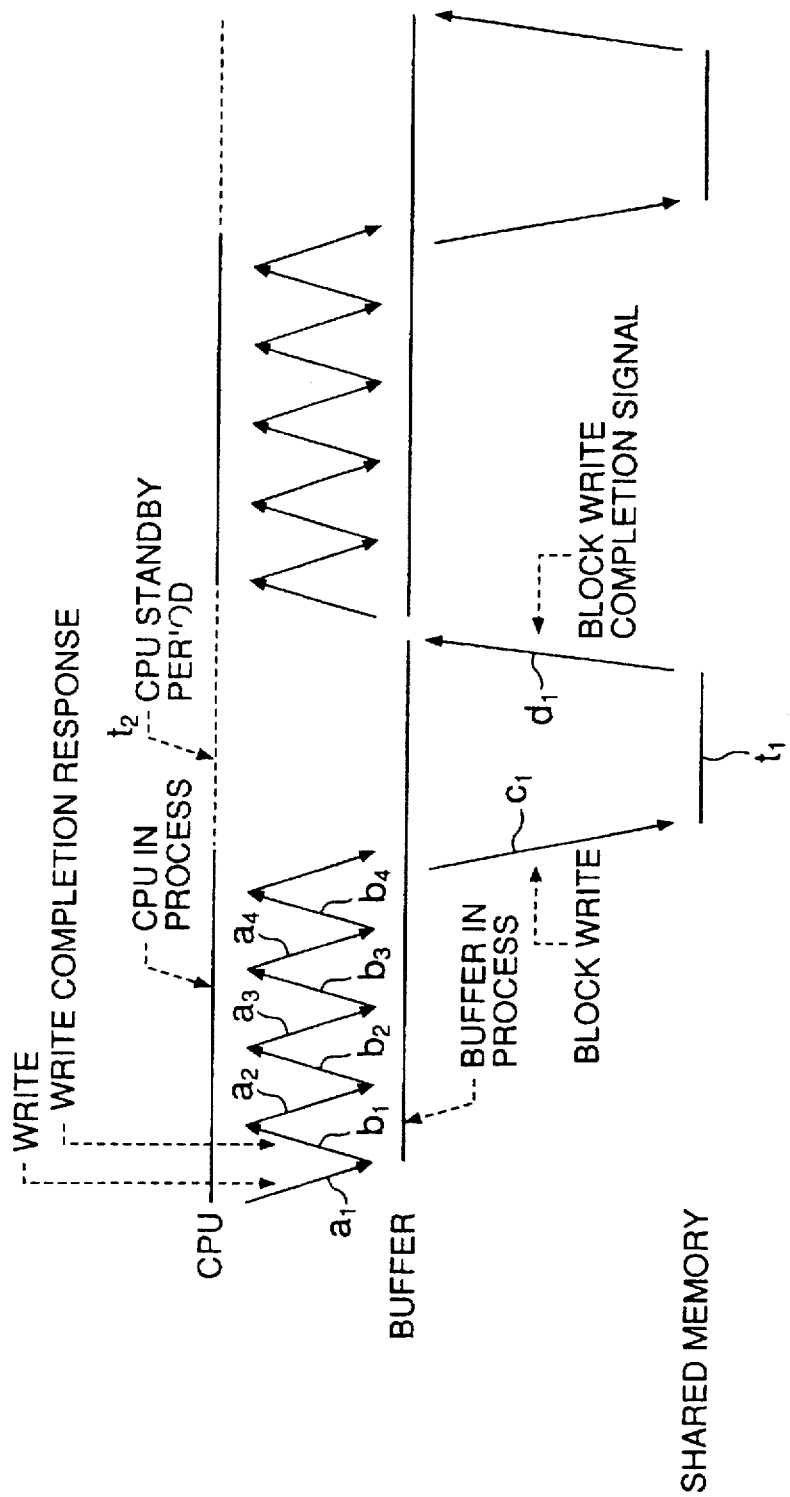
FIG. 1 shows a conventional asynchronous access system.
Figure 2:
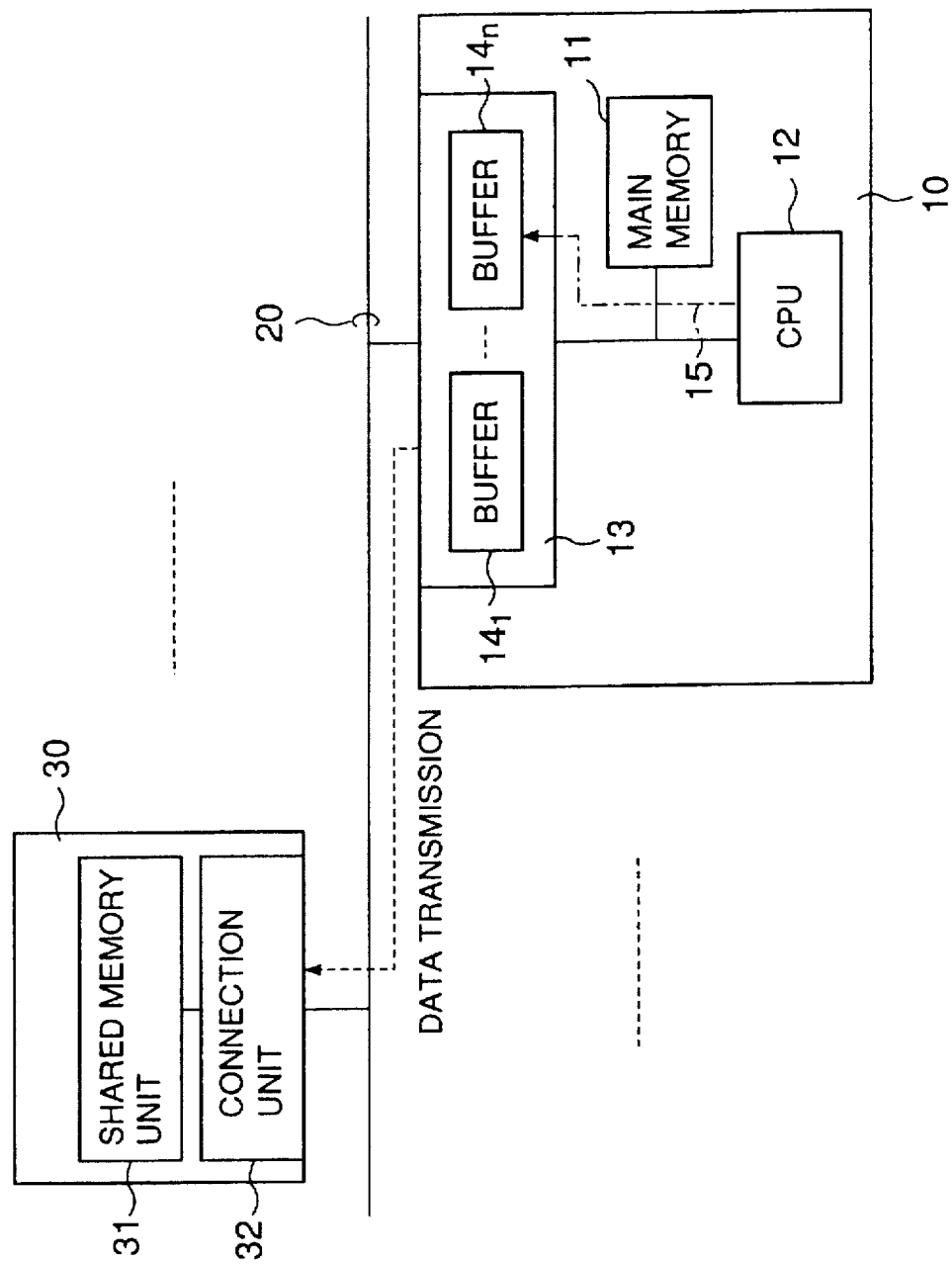
FIG. 2 is a block diagram of the principle of the present invention.

FIG. 2 is a block diagram of the principle of the present invention. An asynchronous access system shown in FIG. 2 includes a plurality of processing modules, one or a plurality of shared system memory modules 30, and a shared system bus 20 connecting the above modules together. In FIG. 2, one processing module 10 and one shared system memory module 30 are shown. However, the other processing modules 10 (not shown in FIG. 2) are the same as the processing module shown in FIG. 2, and the other shared system memory modules 30 (not shown in FIG. 2) are the same as the shared system memory module shown in FIG. 2.

As shown in FIG. 2, the processing module 10 includes a main memory 11, a central processing unit (CPU) or processor 12, and a connection unit 13 for connection to the system bus 20. The connection unit 13 includes a plurality of buffers $14_1$ through $14_n$, where n is an integer. The shared system memory module 30 includes a shared system memory unit 31 and a connection unit 32 for a connection to the system bus 20.

The connection unit 13 requests the shared system memory module 30 to asynchronously access it via the system bus 20 in order to write block data therein. It will now be assumed that data is being transmitted from the buffer 141 to the shared system memory module 30 after a request to write block data into the shared system memory module 30 is accepted. In this state, if the CPU 12 generates a new request to write data into the shared system memory module 30, the connection unit 13 recognizes the occurrence of such a new request, receives block data relating to the new request from the CPU 12, and causes the received data to be written in one of the buffers $14_2$ through $14_n$ other than the buffer $14_1$. Hence, the connection unit 13 can accept a new write request while it is using the buffer $14_1$ from which block data is being transmitted to the shared system memory module 30.

Figure 3:
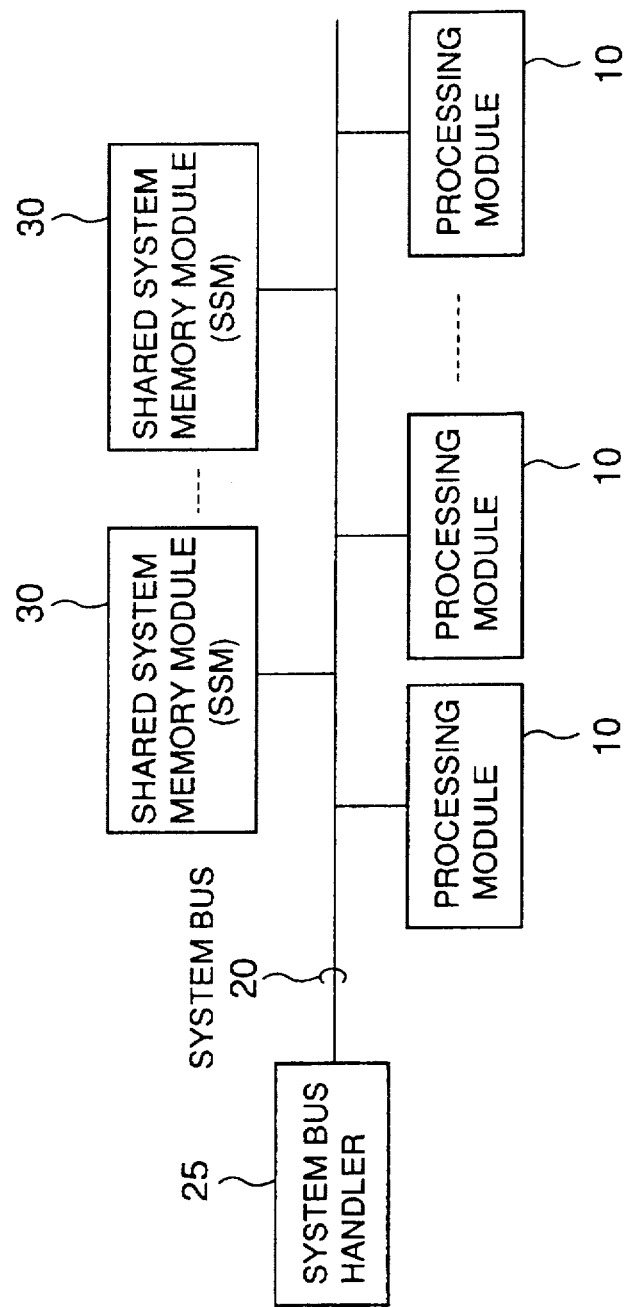
FIG. 3 is a block diagram of a computer system to which the present invention is applied.

FIG. 3 shows a computer system to which the present invention is applied. The computer system shown in FIG. 3 is made up of a plurality of processing modules 10, a plurality of shared system memory modules 30, a system bus 20 connecting these modules together, and a system bus handler 25 integrally controlling arbitration of the system bus 20. In the configuration shown in FIG. 3, only a single system bus is used. However, the present invention can be applied to a computer system having a plurality of system buses 20 independent of each other, in which the processing modules 10 and the shared system memory modules 30 are connected together via the system buses 20.

Figure 4:
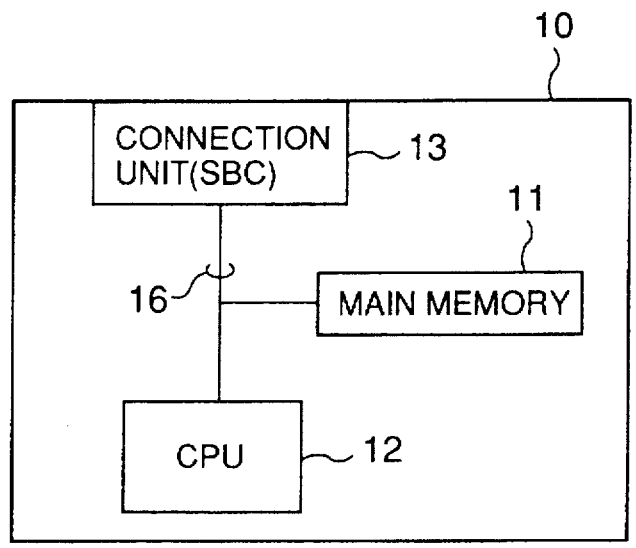
FIG. 4 is a block diagram of a processing module shown in FIG. 3.

FIG. 4 shows the structure of each of the processing modules 10. The processing module 10 shown in FIG. 4 is made up of the aforementioned main memory 11, the CPU 12, the connection unit (SBC) 13 for connection to the system bus 20, and an internal bus 16 connecting the main memory 11, the CPU 12 and the connection unit 13 together. A program stored in the main memory 11 is executed by the CPU 12 while using the main memory 11 as a work area, and controls the overall operation of the processing module 10. The CPU 12 of the processing module 10 fetches an instruction code from the main memory 11. Further, a specific unit number is assigned to the connection unit 13.

Figure 5:
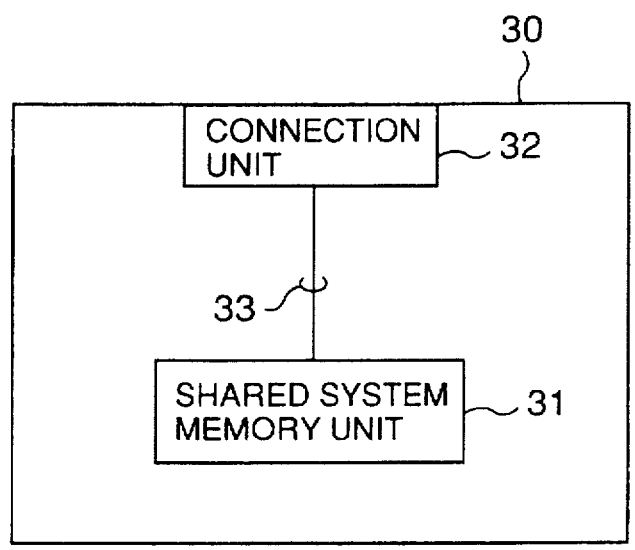
FIG. 5 is a block diagram of a shared system memory module shown in FIG. 3.

FIG. 5 shows the structure of each of the shared system memory modules 30. The shared system memory module shown in FIG. 5 includes the aforementioned shared system memory unit 31, the connection unit 32 and an internal bus 33 connecting the units 31 and 32 together. Data necessary for sharing the shared system memory modules 30 by the processing modules 10 shown in FIG. 3 is stored in the shared system memory unit 31.

Figure 6:
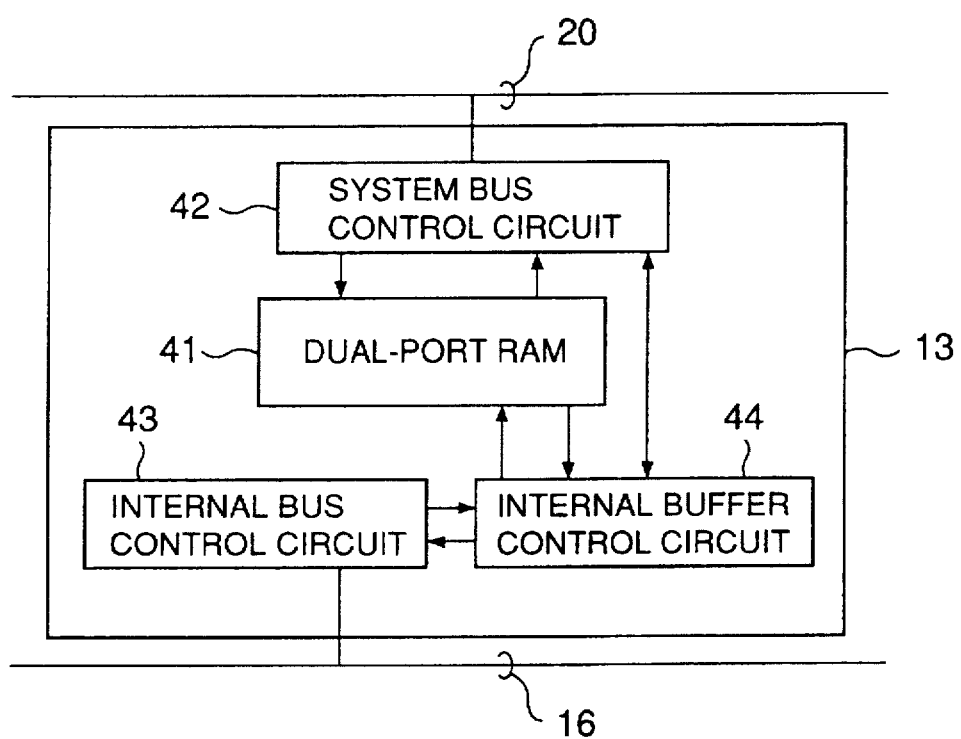
FIG. 6 is a block diagram of a connection unit provided in the processing module shown in FIG. 3.

FIG. 6 shows the structure of the connection unit 13 of the processing module 10 shown in FIG. 4. In FIG. 6, parts that are the same as those shown in the previously described figures are given the same reference numbers as previously. The connection unit 13 is made up of a dual-port RAM (Random Access Memory) 41, a system bus control circuit 42, an internal bus control circuit 43, and an internal buffer control circuit 44. The system bus control circuit 42 controls transfers of data between the dual-port RAM 41 and the system bus 20. The internal bus control circuit 43 is connected to the internal bus 16. The internal buffer control circuit 44 controls the read and write operations of the dual-port RAM 41.

Figure 7:
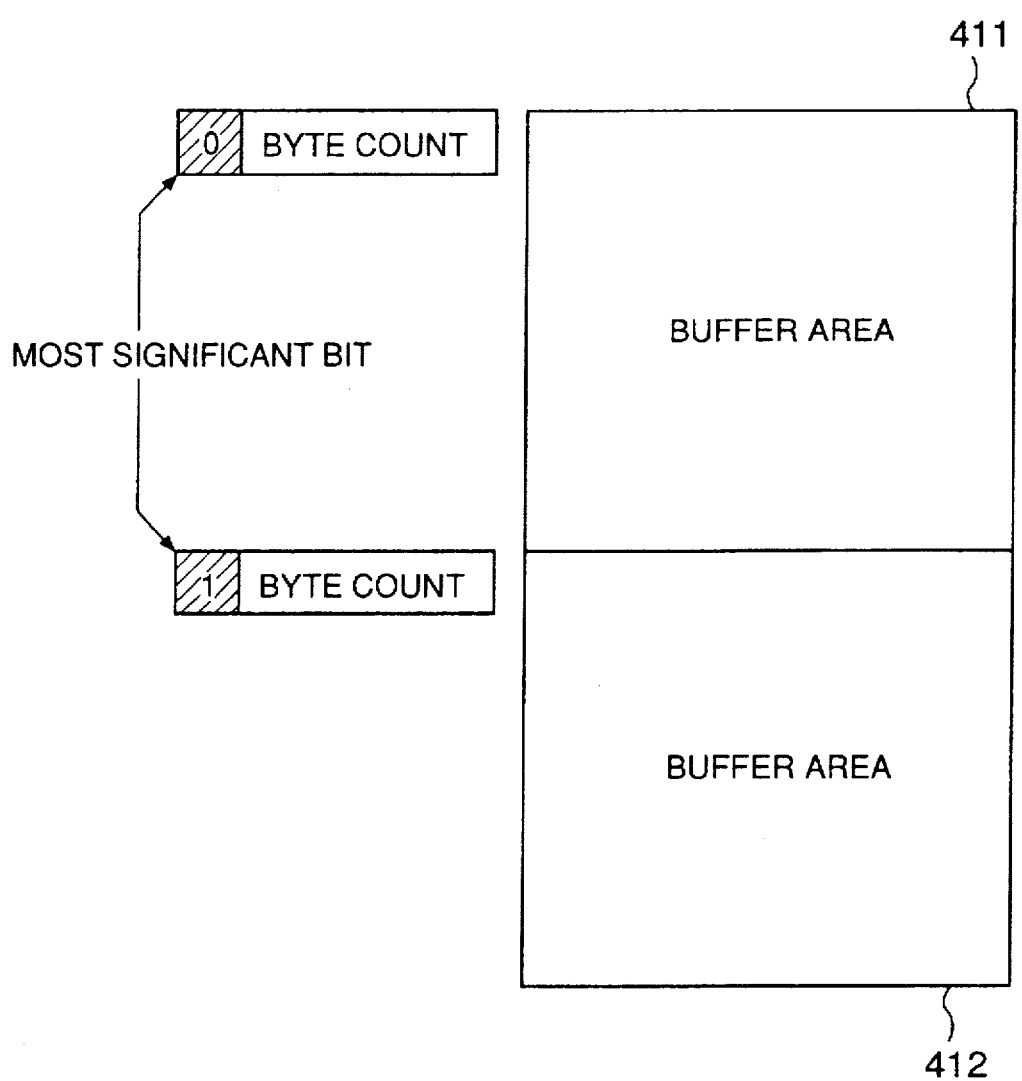
FIG. 7 is a diagram showing how a dual-port RAM shown in FIG. 6 is used.

The dual-port RAM 41 forms the internal buffers $14_1$ through $14_n$ shown in FIG. 2. As shown in FIG. 7, the storage area of the dual-port RAM 41 is segmented into a first buffer area 411 and a second buffer area 412. When the most significant bit of a counter value indicated by a byte counter (BCT) provided in the internal buffer control circuit 44 is "0" (when a state machine 51 is in a BS state, as will be described later), the first buffer area 411 is selected as a write buffer. When the most significant bit of the counter value of the byte counter is "1" (when a state machine 52 is in the BS state), the second buffer area 412 is selected as a write buffer. That is, the buffer areas 411 and 412 function as the buffers $14_1$ and $14_2$ (n=2).

The connection unit 13 shown in FIG. 6 carries out a synchronous access to the shared system memory module 30 in which data is transferred for each word per access instruction, and an asynchronous access thereto in which data is transferred for each block consisting of a plurality of words per access instruction.

Figure 8A:
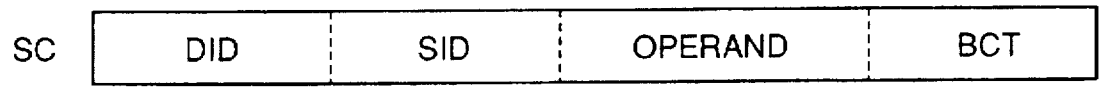
FIGS. 8A and 8B are diagrams of commands used in the connection unit shown in FIG. 6.
Figure 8B:
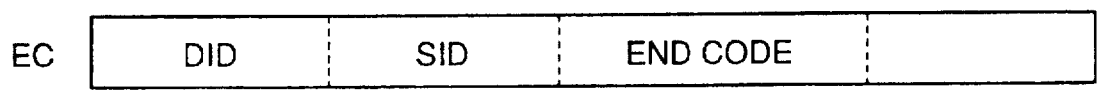

FIGS. 8A and 8B show the formats of commands used in the connection unit 13 (a split transfer system). More particularly, FIG. 8A shows a transfer starting command SC, and FIG. 8B shows a transfer response command EC.

As shown in FIG. 8A, the transfer starting command SC includes information indicating a destination identifier DID, a source identifier SID, an operand, and the aforementioned byte counter BCT. The destination identifier DID indicates the unit identifier of a module to which data is to be transferred. The source identifier SID indicates the unit identifier of a module from which data is to be transferred. The operand indicates the type of access. A plurality of types of access are provided. Examples of the types of access are a memory access to the shared system memory module 30, a halt instruction to the shared system memory module 30 and an access to control registers in which reset instruction are registered. The byte counter indicates the quantity of data transferred by an access to the shared system memory module 30.

The destination identifier DID and the source identifier SID of the transfer response command EC shown in FIG. 8B are the same as those of the transfer starting command SC shown in FIG. 8A. An end code of the transfer response command EC indicates whether or not the transfer is completed with an error.

Figure 9:
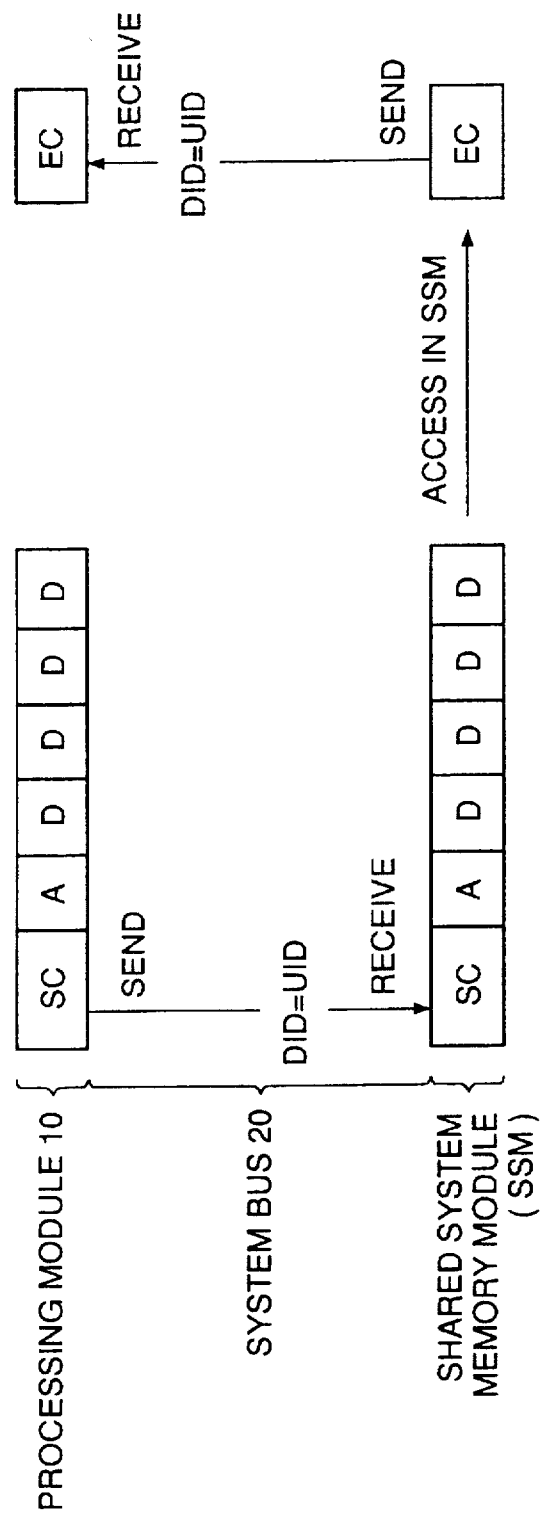
FIG. 9 is a diagram showing how a write access is carried out.

FIG. 9 shows a store access in which data is transferred from the processing module 10 to the shared system memory module 30 via the system bus 20 and is written into the shared system memory module 30. The processing module 10 which is the access source generates the transfer starting command SC. More particularly, the processing module 10 generates the source module identifier SID corresponding to its own identifier, the destination module identifier DID of the destination module to which data is transferred, the operand indicating a memory write access, and the counter value of the byte counter BCT indicating the quantity of data to be transferred. The above transfer starting command SC is transferred via the system bus 20, and subsequently an access address A on the shared system memory module 30 to be accessed, and data D to be stored in the shared system memory module 30 are consecutively transferred via the system bus 20.

The shared system memory module 30 monitors the system bus 20, and compares the destination identifier contained in the received transfer starting command SC with its own module identifier. When it is determined that both the identifiers match, the shared system memory module 30 starts the receiving operation. Then, the connection unit 32 of the shared system memory module 30 accesses the shared system memory unit 31 (FIG. 5) in order to write the received data D thereon. When the data D are completely written into the shared system memory unit 31, the connection unit 32 of the shared system memory module 30 generates the transfer response command EC in which the identifier of the module 30 is included as the source module identifier SID and the identifier of the processing module 10 is included as the destination module identifier DID. Then, the transfer response command EC is transferred to the processing module 10 via the system bus 20.

The processing module 10 monitors the system bus 20, and performs the receiving operation when the destination module identifier DID contained in the received transfer response command EC coincides with its own identifier. In the above manner, one access is completed.

During the idle period between the end of transmission of the transfer starting command SC and the beginning of transmission of the transfer response command EC, the system bus 20 can be used to transfer the transfer starting command SC or the transfer response command EC resulting from another access.

In a case where an improvement in the access speed is attempted by performing block data transfers by the processing module 10, writing of data into the shared system memory module 30 is carried out after the CPU 12 in the processing module 10 completes execution of an instruction. Hence, it is necessary to consider an operation which should be carried out when an exception occurs during the write operation. For example, such an exception operation is needed when a parity error introduced during a transfer of data via the system bus 20 is detected or when an exception process of the program is initiated.

Figure 10:
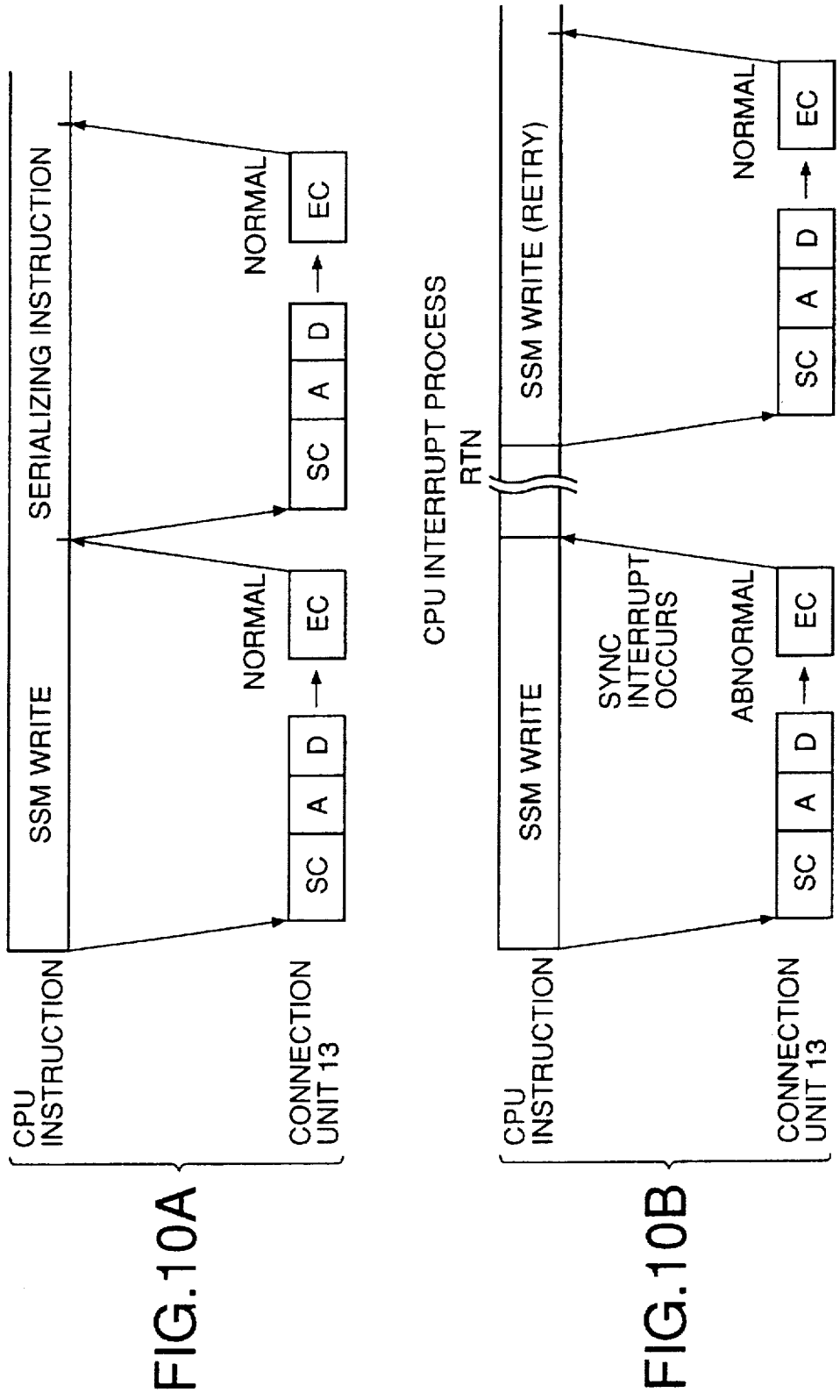
FIGS. 10A and 10B are timing sequence charts of the operation of the processing module carried out when data is transferred to and written into the shared system memory module.

When a write instruction to the shared system memory module (indicated as SSM in FIGS. 10A and 10B) 30 is issued by the CPU 12, the CPU and the connection unit 13 operate according to in the prior art, as shown in FIG. 10A. It will be noted that FIGS. 10A and 10B are originally related to the embodiment of the present invention, but will also be referred to when the prior art is described.

As shown in FIG. 10A, the connection unit 13 of the processing modules 10 serially outputs the command SC, the address A and the write data D to the shared system memory module 30 via the system bus 20. When the data writing does not have any error, as shown in FIG. 10A, the transfer response command EC indicating that the data transfer is completed without error is returned to the CPU 12 via the system bus 20 and the connection unit 13.

If an error has occurred as shown in FIG. 10B, the transfer response command EC indicating abnormality of the transfer is returned to the CPU 12 via the connection unit 13. The CPU 12 utilizes an instruction-synchronized interrupt function (routine: RTN) equipped therewith, and generates an interrupt in synchronism with the write instruction. Then, the CPU 12 stores the access address and store data in a stack formed in the main memory 11, and thereafter proceeds with a branched interrupt routine. An interrupt handler formed by software can read, from the stack, information necessary for a recovery process, such as a retry process. Then, the retry process for the shared system memory module 30 is carried out. If the retry process is completed without error, the transfer response command EC indicating that the retry process is completed without error is returned to the CPU 12 via the connection unit 13.

As described above, in the prior art, the CPU 12 cannot process other instructions while data is being written into the shared system memory module 30 via the system bus 20. The interruption of the writing operation degrades the throughput of the overall system.

On the other hand, according to the embodiment of the present invention, the CPU 12 can perform instructions in asynchronism with the data transfer via the system bus 20. Hence, the execution of an instruction by the CPU 12 may much proceed to the transfer of data relating to the above instruction. However, when an exception has occurred, the write address and/or store data may be updated by execution of a subsequent instruction. Hence, the recovery process based on only the above-mentioned sequence shown in FIG. 10B is incomplete. More specifically, the recovery process based on only the conventional sequence shown in FIG. 10B will encounter the following disadvantages. First, an exception is detected in asynchronism with instructions executed by the CPU 12, and the simple synchronous interrupt is not suitable for asynchronous operation. Second, by the time when an exception is detected, information necessary for the recovery process may have been lost.

With the above in mind, according to the embodiment of the present invention, a serializing instruction for use in writing is provided, and further an exception notification to the CPU 12, an improved recovery process and a cancellation of the retry process are carried out.

The serializing instruction for writing ensures completion of the writing operation. Hereinafter, the serializing instruction is referred to as a write serializing instruction. As shown in 10A, when the write serializing instruction is issued, a write request stored in one of the buffers $14_1$ through $14_n$ at that time is processed, and execution of the write serializing instruction is completed after the data is completely written into the shared system memory module 30. If an exception has occurred during the writing operation, an exception interrupt is generated in synchronism with the write instruction. Hence, by adding the write serializing instruction to the end of a specific write unit (write instruction unit in an extreme case), it becomes possible to synchronize the writing operation by hardware and execution of instructions. That is, execution of the write serializing instruction means completion of actual writing by hardware.

The CPU 12 is notified of the occurrence of an exception using the aforementioned instruction-synchronized interrupt function. The instruction-synchronized interrupt function is activated in synchronism with an access to the shared system memory module 30 or execution of the write serializing instruction. The occurrence of the interrupt in synchronism with execution of the write serializing instruction means that the immediately previous writing operation failed. When the interrupt occurs in synchronism with an access to the shared system memory module 30, it is originally impossible to determine whether the above interrupt results from an access instruction to the shared system memory module 30 which directly generates the interrupt (that is, the write serializing instruction subsequent to the write or read instruction) or the previous write instruction to the shared system memory module 30 immediately prior to the above access instruction which directly generates the interrupt. With the above in mind, a flag is prepared in the control register of the connection unit 13. The flag is used to determine whether the interrupt results from an access instruction which generates the immediately previous writing or a write instruction which generates the previous interrupt.

It is possible to identify an instruction which fails to access the shared system memory module 30 by the write serializing instruction and the notification to the CPU 12. However, information necessary for the recovery process is still incomplete. With the above in mind, the connection unit 13 holds information concerning writing of block data which failed to access the shared system memory module 30. When the retry process for an access which has failed is instructed by the CPU 12, the connection unit 13 performs the retry process. That is, the connection unit 13 is equipped with a mechanism of performing the retry process in response to the instruction from the CPU 12. Hence, the interrupt handler can perform the recovery process without getting and analyzing information concerning the exception.

When an exception is caused by software alone, the exception is repeatedly generated even if the retry process is carried out by the above-mentioned mechanism. In order to eliminate the above problem, it is necessary to cancel the retry process pending in the connection unit 13. The connection unit 13 has a control register storing data for cancelling the retry process. When the interrupt handler makes a decision that the pending access held in the connection unit 13 cannot be retried, the above control register is referred to and the retry process for the pending access held in the connection unit 13 is canceled.

Figure 11:
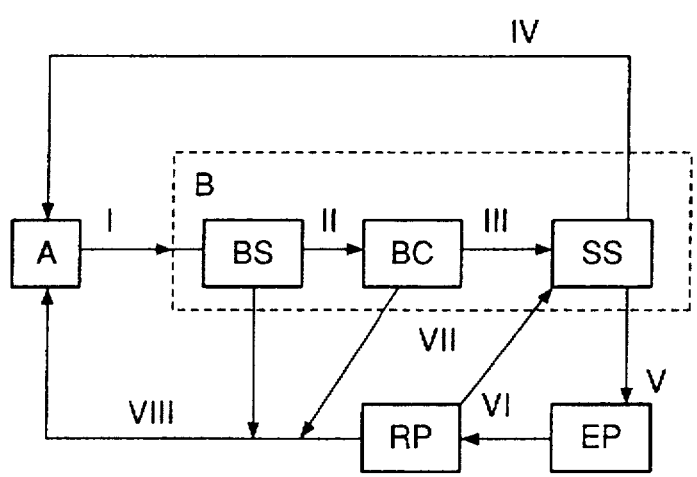
FIG. 11 is a diagram showing a state transition of buffers.

In order to realize the above-mentioned architecture, the internal buffer control circuit 44 of the connection unit shown in FIG. 6 defines six states A, BS, BC, SS, RP and EP of the two buffer areas 411 and 412 formed in the dual-port RAM 41, and transfers the states of the two buffer areas 411 and 412 in accordance with a state transition sequence shown in FIG. 11.

In the state A (Available), there is no pending access in the connection unit 13, and a new access can be accepted. In the state BS (Buffer Start), data is being stored into either the buffer area 411 or 412. In the state BC (Buffer Complete), storing of data into the buffer area has completed and an access to the shared system memory module 30 is made pending. In the state SS (SSM Store), data is being written into the shared system memory module (SSM) 30. In the state RP (Retry Pending), the retry process for an access to the shared system memory module 30 which failed immediately before is made pending. In the state EP (Exception Pending), an access to the shared system memory module 30 ends abnormally and the exception process is made pending.

Further, the states BS, BC and SS are busy states B until the access is completed after it is accepted. A transition from the state A to the state BS is carried out when an OR operation on all states (states [1], [2], [3], [4] and [5] shown in Table 2, which will be described later) available during the above transition is performed and asserted.

A transition from the state BS to the state BC is carried out when an OR operation on all states available during the above transition (see Tables 1 and 2) is calculated and asserted. A transition from the state BC to the state SS is carried out when an OR operation on all states available during the above transition (see Tables 1 and 2) is calculated and asserted. A transition from the state SS to the state A is carried out when an OR operation on all states available during the above transition (see Tables 1 and 2) is calculated and asserted. A transition from the state SS to the state EP is carried out when an OR operation on all states available during the above transition (see Tables 1 and 2) is calculated and asserted. A transition from the state EP to the state RP is carried out when an OR operation on all states available during the above transition (see Tables 1 and 2) is calculated and asserted. A transition from the state RP to the state SS is carried out when an OR operation on all states available during the above transition (see Tables 1 and 2) is calculated and asserted. Further, the state is changed from the state RP to the state A when a retry-cancel signal from the internal bus control circuit 43 is asserted.

Referring to FIG. 6 again, the storage area of the dual-port RAM 41 is segmented into the two buffer areas 411 and 412, and internal buffer control circuit 44 selects either the buffer area 411 or 412. Then, data to be transferred to the shared system memory module 30 is written into the selected buffer area. When data is being transferred from either the buffer area 411 or 412, data to be transferred from the CPU 12 to the shared system memory module 30 can be written into the other buffer area.

Figure 12:
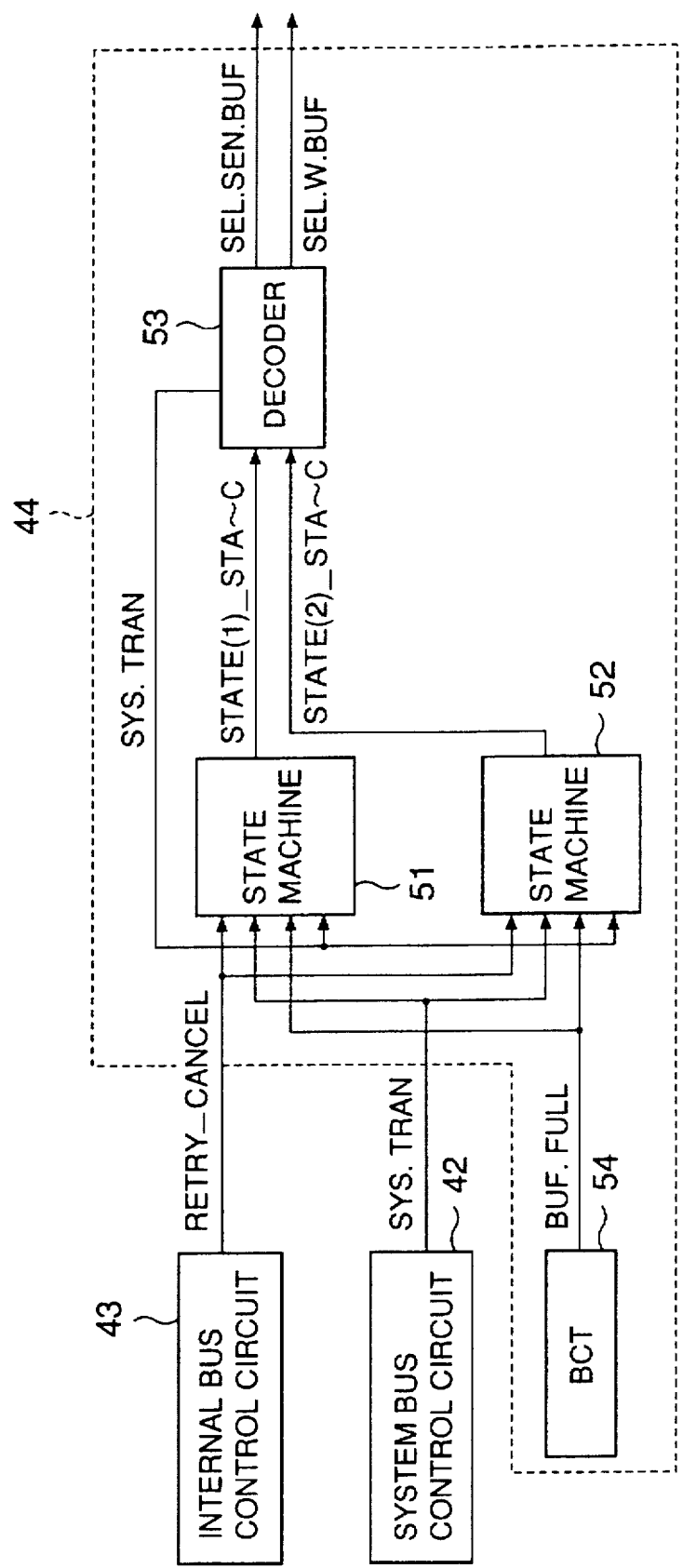
FIG. 12 is a block diagram of an essential part of the embodiment of the present invention.

FIG. 12 shows the structure of the internal buffer control circuit 44. In FIG. 12, parts that are the same as those shown in FIG. 6 are given the same reference numbers as previously. The internal buffer control circuit 44 is made up of state machines 51 and 52, and a decoder 53. Each of the state machines 51 and 52 has the same configuration as the other, and is more particularly configured as shown in FIG. 13.

Figure 13:
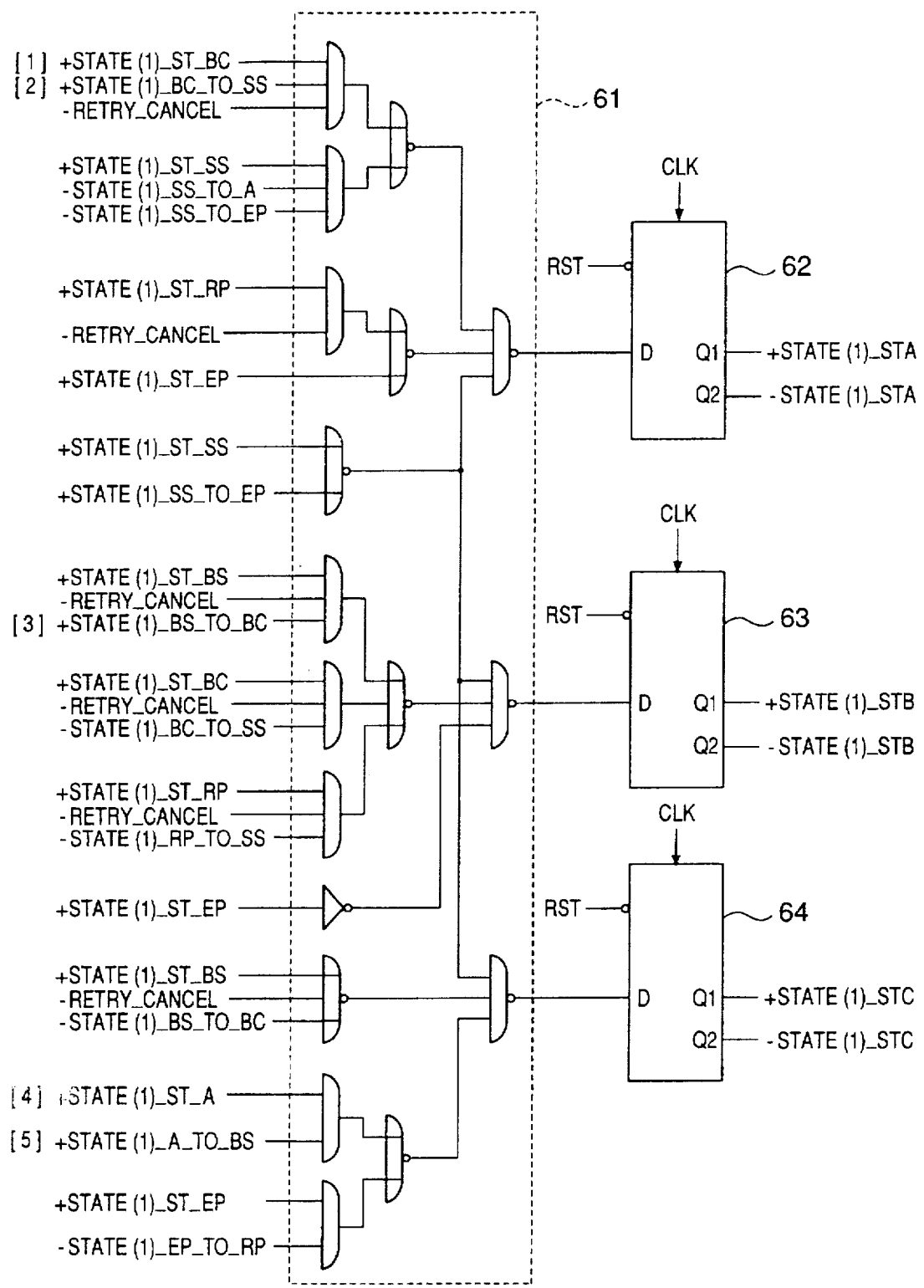
FIG. 13 is a block diagram of a state machine shown in FIG. 12.

As shown in FIG. 13, the state machine 51 (52) includes a gate circuit group 61, and three D-type flip-flops (DFF) 62, 63 and 64. The gate circuit group 61 is made up of a plurality of gates, as shown in FIG. 13, and receives the retry cancellation signal RETRY-CANCEL, a state transition signal SYS.TRAN from the system bus control circuit 42, a state transition signal STS.TRAN from the decoder 53, and a detection signal BUFF.FULL from the byte counter (BCT) 54. The detection signal BUFF.FULL indicates that the buffers are full of data.

The state transition signal SYS.TRAN indicates the following three transistions, namely, STATE(1)-SS-TO-A in which the state of the first buffer area 411 pending in the state machine 51 is changed from the state SS to the state A, STATE(1)-SS-TO-EP in which the state of the first buffer area 411 pending in the state machine 51 is changed from the state SS to the state EP, and STATE(1)-BC-TO-SS in which the state of the first buffer area 411 pending in the state machine 51 is changed from the state BC to the state SS, as shown in Table 1.

TABLE 1

| State of 51 | State of 52 | Transfer result* | Operations |
|---|---|---|---|
| SS | other than BC | normal | 51: SS→A |
|  | BC | normal | 51: SS→A  52: BC→SS |
|  | all states | abnormal | 51: SS→EP |
| not BC |  | normal | 52: SS→A |
| BC | SS | normal | 52: SS→A  51: BC→SS |
|  | all states | abnormal | 52: SS→EP |

*: result of transfer of data attempted to be written into a shared memory space The state transition signal STS.TRN is a signal STATE(1)-X-TO-Y (where X: A, RP, EP or BS, Y: BS, SS, RP or BC) in which the state pending in the state machine 51 is changed from state X to state Y, as shown in Table 2.

TABLE 2

| State of 51 | State of 52 | Continuity of address | Operations |  |
|---|---|---|---|---|
| A | A | *- - - - | 51: A→BS | [1] |
| A | SS | - - - - | 51: A→BS | [2] |
| A | RP | - - - - | 52: RP→SS |  |
| A | EP | - - - - | 52: EP→RP |  |
| SS | A | - - - - | 52: A→BS | [3] |
| RP | A | - - - - | 51: RP→SS |  |
| EP | A | - - - - | 51: EP→RP |  |
| BS | A | no | 51: BS→SS  52: A→BS | [4] |
| BS | A | yes | no state transition |  |
| BS | SS | no | 51: BS→BC |  |
| BS | SS | yes | no state transition |  |
| BS | RP | - - - - | 52: RP→SS |  |
| BS | EP | - - - - | 52: EP→RP |  |
| C | A | - - - - | no state transition |  |
| B | SS | - - - - | no state transition |  |
| BC | RP | - - - - | 52: RP→SS |  |
| BC | EP | - - - - | 52: EP→RP |  |
| A | BS | no | 52: BS→BC→SS  51: A→BS | [5] |
| A | BS | yes | no state transition |  |
| SS | BS | no | 52: BS→BC |  |
| SS | BS | yes | no state transition |  |
| RP | BS | - - - - | 51: RP→SS | [6] |
| EP | BS | - - - - | 51: EP→RP |  |
| A | BC | - - - - | no state transition |  |
| SS | BC | - - - - | no state transition |  |
| RP | BC | - - - - | 51: RP→SS |  |
| EP | BC | - - - - | 51: EP→RP |  |

*: not related to continuity

The output signal BUFF.FULL of the byte counter 54 shown in FIG. 12 is contained in signals STATE(1)-BS-TO-BC, STATE(2)-BS-TO-BC in which the states of the state machines 51 and 52 change from the state BS to the state BC. That is, the state transition signal STATE(1)-BS-TO-BC is the result of an OR operation on the result of an OR operation on the BUFF.FULL and the value obtained when the state machine 51 is in the state BS and an OR operation on the BUFF.FULL and values obtained when the state machine 51 changes from the state BS to the state BC. Each of the state transition signals has two types, one of which has a primary phase (+) and the other of which has a secondary phase (−).

The flip-flops 62, 63 and 64 respectively receive the corresponding output signals from the gate circuit group 61 via respective data input terminals, and output control signals STATE(1)-STA, STATE(1)-STB and STATE(1)-STC indicating states pending in the state machine 51.

The decoder 53 identifies, on the basis of the output control signals of the state machines 51 and 52, and outputs the state transition signal STS.TRAN to the state machines 51 and 52 in accordance with Table 2. Further, the decoder 53 generates a select signal SEL.W.BUF specifying the buffer area into which data from the CPU 20 should be written, and a select signal SEL.SEN.BUF specifying the buffer area from which data is read under the control of a transmission circuit formed in the system bus control circuit 42.

Table 3 shows the relationship between the states of the buffer and the output signals used when the buffer area 411 is controlled by the select signals SEL.W.BUF and SEL.SEN.BUF generated by the decoder 53 on the basis of the output signals of the flip-flops 62 through 64.

TABLE 3

| State (1)-ST | | | |
|---|---|---|---|
| A | B | C | State of buffer |
| 0 | 0 | 0 | A |
| 0 | 0 | 1 | BS |
| 0 | 1 | 0 | BC |
| 1 | 0 | 0 | SS |
| 1 | 1 | 0 | RP |
| 1 | 1 | 1 | EP |

For example, when both the state machines 51 and 52 are in the state A ([1] in Table 2), the state of the state machine 51 is changed from the state A to the state BS, and the signals indicated by [4] and [5] shown in FIG. 13 are asserted. Hence, "1" is applied to the data input terminal of the flip-flop 64 and is latched therein. Since signals other than the signals indicated by [4] and [5] shown in FIG. 13 are not asserted, "0" is input to the data input terminals of the flip-flops 62 and 63, and are latched therein. Hence, the combination of the output signals of the flip-flops 62, 53, and 64, (+STATE(1)-STA, +STATE(1)-STB, +STATE(1)-STC) is (0, 0, 1). As can be seen from Table 3, the state machine 51 switches to the state BS and the buffer area 411 is selected, so that data is written into the buffer area 411.

It will be noted that the internal buffer control circuit 44 includes an address generating circuit for generating a write address for the dual-port RAM 41 and a write address for the shared system memory module 30, and a write control circuit for controlling the writing operation on the address generating circuit and the dual-port RAM 41.

A description will now be given, with reference to FIG. 11, of the operation of the configuration shown in FIG. 12.

When the internal bus control circuit 43 recognizes an access by a write instruction to the shared system memory module 30 from the CPU 12, the internal bus control circuit 43 activates the internal buffer control circuit 44 so that the state machine 51 switches to the state BS, as indicated by [1] in Table 2 (I in FIG. 11). At this time, the most significant bit of the counter value of the byte counter (BCT) 54 is "0", and the buffer area 411 is selected as a write buffer.

Data from the CPU 12 is stored in the buffer area 411 maintained in the state BS, and the counter value of the byte counter 54 is incremented on the basis of data stored in the buffer area 411. Further, if data writing is carried out for an area indicated by an address subsequent to the previous address, data is stored in the buffer area 411 and the count value of the byte counter 54 is further incremented.

When the above operation is repeatedly performed, and a state in which the buffer area 411 becomes full of data equal to one block is detected via the counter value of the byte counter 54, or when the aforementioned serializing instruction is recognized, as indicated by [4] in Table 2, the buffer area 411 switches from the state BS to the state BC and then to the state SS (II and III shown in FIG. 11). Further, the other buffer area 412 switches from the state A to the state BS. AT this time, the most significant bit of the byte counter 54 is "1", and the buffer area 412 is selected as a write buffer.

When the system bus control circuit 42 determines that the state machine 51 has switched to the state SS, the circuit 42 issues a block write request to the shared system memory module 30 via the built-in transmission circuit. Thereafter, the circuit 42 reads data equal to one block from the buffer area 411, and outputs the read block data to the system bus 20. If the transfer response command EC from the shared system memory module 30 indicates that the write operation is completed without error, as shown in Table 1 the buffer 411 and the state machines 51 switch to the state A (IV in FIG. 11).

If the transfer response command EC indicates the write operation is abnormal, the state machines 51 and the buffer area 411 are changed from the state SS to the state EP (V in FIG. 11), and an error state is made pending. In this state, if the internal buffer control circuit 44 recognizes a new access to the shared system memory module 30 by the write instruction or the serializing instruction, the circuit 44 informs the CPU 12 of the occurrence of the abnormal state. Hence, as indicated by [6] shown in Table 2, the buffer area 411 switches to the state EP (VI in FIG. 11), and the retry process for the access which has failed is made pending.

If a new access to the shared system memory module 30 or the serializing instruction is recognized by the internal buffer control circuit 44 in the above state EP, as shown in Table 2, the buffer area 411 switches to the state SS (VII shown in FIG. 11), and the pending access is restarted. If the access cancellation instruction from the CPU 12 is received by the internal bus control circuit 43, the retry cancellation signal RETRY-CANCEL is asserted, and hence the buffer area 411 switches to the state A (VIII shown in FIG. 11).

It can be seen from Tables 1 and 2 that, if either the buffer area 411 or 412 (state machine 51 or 52) remains in one of the states SS, EP and RP, the other area is prevented from switching to the state SS and remains in one of the states A, BS and BC. Further, the other area is selected as a write buffer into which data from the CPU 12 to the shared system memory module 30 is written. Hence, when the buffer area 411 remains in one of the states SS, EP and RP, data from the CPU 12 to the shared system memory module 30 is stored in the other buffer 412 which remains in the state BS.

FIG. 14 schematically shows the operation of the abovementioned embodiment. As shown in FIG. 14, one-block data which is to be transferred from the CPU 12 to the shared system memory module 30 is stored in the buffer area 411 during a period $t_a$, and is transferred to the system bus 20 during a period $t_b$. Simultaneously, data to be transferred from the CPU 12 to the shared memory module 30 is stored in the other buffer area 412 during a period $t_c$. When the buffer area 412 becomes full of data, the above data is read therefrom during a period $t_d$, while next data is written into the buffer area 411 during a period $t_e$. At this time, data has been completely read from the buffer area 411 during the period $t_b$. Hence, the CPU 12 can always operate, as schematically indicated by Z in FIG. 14, so that the wait time of the CPU 12 can be much reduced and the efficiency of execution of instructions can be much improved.

The above embodiment can be modified. For example, it is possible to equally use, instead of the buffer areas 411 and 412 alternately used, three or more buffer areas in the dual-port RAM 41. Further, it is also possible to provide a plurality of dual-port RAMs.

The present invention is not limited to the specifically disclosed embodiment, and variations and modifications may be made without departing from the scope of the present invention.

What is claimed is:

1. An asynchronous access system for a computer system, comprising:

processing modules performing processes;

at least one shared system memory module; and a system bus connecting the processing modules and said at least one shared system memory module, each of said processing modules comprising:
   a processor,
   a plurality of buffers coupled to the processor and the system bus, wherein said processor generates write instructions to write data into said at least one shared system memory module via the plurality of buffers and the system bus, and
   controlling means for concurrently writing, when first data from the processor written into a first one of the plurality of buffers in response to a first write instruction is being transferred to said at least one shared system memory module via the system bus, second data from the processor into a second one of the plurality of buffers in response to a second write instruction generated by the processor after the first write instruction.

2. The asynchronous access system as claimed in claim 1, wherein:

the first write instruction indicates a first address of a first storage area in said at least one shared system memory module;

the second write instruction indicates a second address of a second storage area in said at least one shared system memory module; and the first and second addresses are consecutive addresses.

3. The asynchronous access system as claimed in claim 1, wherein the first data and the second data respectively amount to a block containing a plurality of words.

4. The asynchronous access system as claimed in claim 1, wherein said controlling means comprises means for sending a write request to said at least one shared system memory module when the first data amounting to one block has been written into the first one of the plurality of buffers, so that the first write instruction and the write request are serialized.

5. The asynchronous access system as claimed in claim 1, wherein said controlling means comprises means for sending a write request to said at least one shared system memory module when the second data amounting to one block has been written into the second one of the plurality of buffers and the first data has been transferred to said at least one shared system memory module, so that the second write instruction and the write request are serialized.

6. The asynchronous access system as claimed in claim 1, wherein each of said processing modules comprises means for holding, when the first data fails to be transferred to and written into said shared system memory modules, information concerning the first data, and for retrying to transfer the first data to said at least one shared system memory module according to said information.

7. The asynchronous access system as claimed in claim 6, wherein each of said processing modules comprises means for cancelling the first write instruction when the first write instruction is expected to fail to retry to transfer the first data to said at least one shared system memory module.

8. The asynchronous access system as claimed in claim 1, wherein said plurality of buffers are formed in at least one dual-port random access memory.

* * * * *

UNITED STATES PATENT AND TRADEMARK OFFICE
CERTIFICATE OF CORRECTION

PATENT NO. : 5,761,728
DATED : June 2, 1998
INVENTOR(S) : Hiroshi SAITO et al.

It is certified that error appears in the above-identified patent and that said Letters Patent is hereby corrected as shown below:

Col. 2, line 41, delete ":";

Col. 3, line 50, change "141" to --$14_1$--.

Signed and Sealed this

Third Day of November, 1998

Attest:

Attesting Officer

BRUCE LEHMAN

Commissioner of Patents and Trademarks